C. E. CARPENTER.

Assignor to J. M. VANGORDEN.

PENCIL SHARPENER.

No. 11,195. Reissued Sept. 29, 1891.

Witnesses
E. Mottingham
G. F. Downing.

Inventor
C. E. Carpenter.
By H. A. Simmons.
Attorney

THE NORRIS PETERS CO., PHOTO-LITHO., WASHINGTON, D. C.

UNITED STATES PATENT OFFICE.

CLARENCE E. CARPENTER, OF HORSEHEADS, NEW YORK, ASSIGNOR TO JOHN M. VANGORDEN, OF SAME PLACE.

PENCIL-SHARPENER.

SPECIFICATION forming part of Reissued Letters Patent No. 11,195, dated September 29, 1891.

Original No. 440,540, dated November 11, 1890. Application for reissue filed January 14, 1891. Serial No. 377,779.

*To all whom it may concern:*

Be it known that I, CLARENCE E. CARPENTER, of Horseheads, in the county of Chemung and State of New York, have invented certain new and useful Improvements in Pencil-Sharpeners; and I do hereby declare the following to be a full, clear, and exact description of the invention, such as will enable others skilled in the art to which it appertains to make and use the same.

My invention pertains to an improvement in pencil-sharpeners; and it consists in the novel construction and arrangement of the parts whereby a very efficient, simple, and inexpensive sharpener is produced, and one which may be made in edge of a desk, a slate, or in a holder, substantially as hereinafter more fully described, and shown in the accompanying drawings, in which—

Figure 1:
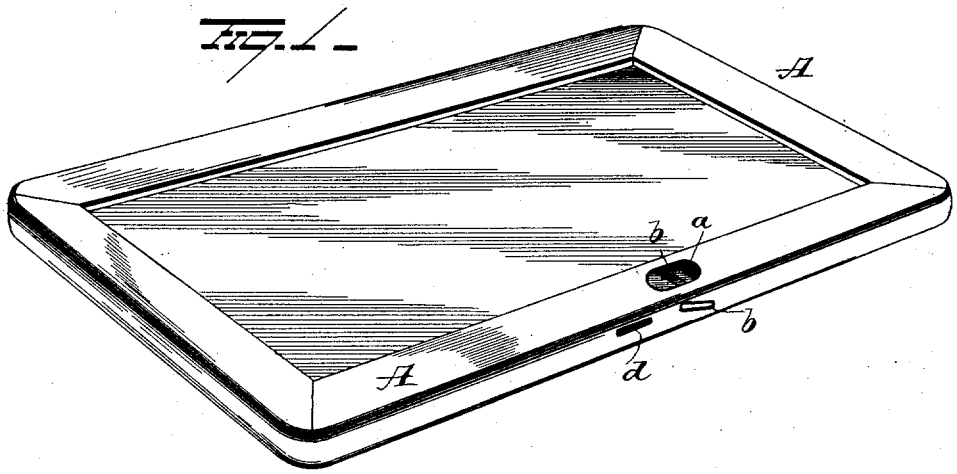
Figure 2:
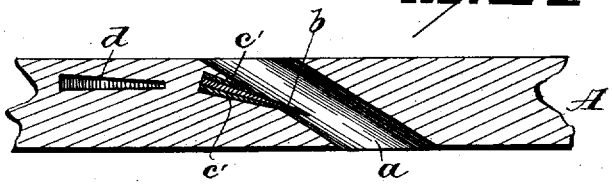
Figure 3:
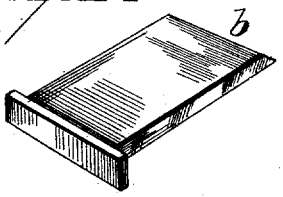

Figure 1 is a perspective view of my pencil-sharpener. Fig. 2 is a side elevation thereof, and Fig. 3 is a detail view of the same.

In the embodiment of my invention I employ a knife-holder frame A, formed in any convenient and suitable shape and comprising an inclined circular slot *a*, running therethrough, which is crossed near its center by knife-blade *b*, suitably inserted and secured in any ordinary manner in inclined recess *b'*, being packed on either side thereof with rubber strips *c' c'* to deaden the sound caused by friction. Thus constructed it will be seen that by inserting the pencil in slot *a* and drawing it toward you and giving the pencil at brief intervals a partial rotation the operation is readily performed and the pencil nicely sharpened, thus saving time and preventing the hands from coming in contact with the pencil-duct.

To protect the knife-blade from becoming rusty from dampness, I provide near recess *b'* a similar recess *d*, in which the blade *b* is inserted, thus completely covering said blade.

I do not confine myself to any particular shape or structure of the slot *b*, as it may be made to conform to any of the various shapes of pencils.

Having thus fully described my invention, what I claim, and desire to secure by Letters Patent, is—

1. In a pencil-sharpener, the combination, with a suitable holder having a slot therein constructed to receive a pencil and provided with a perforation adapted to extend transversely of the slot, of a knife adapted to be inserted in the perforation, so that one edge shall extend across the slot, substantially as set forth.

2. In a pencil-sharpener, the combination, with a holder having an inclined perforation therein and an inclined slot or recess communicating with said perforation, of a knife-blade inserted in said inclined slot or recess and adapted to project into said perforation, substantially as set forth.

3. In a pencil-sharpener, the knife-blade having the rubber strips on either side thereof, in combination with the lateral recess and the circular inclined slot, substantially as shown and described.

4. In a pencil-sharpener, the holder having an inclined slot running therethrough, in combination with the knife-blade having the rubber strips on either side thereof, and the lateral recess in the side of said holder for the reception of said knife-blade, substantially as shown and described.

In testimony whereof I have signed this specification in the presence of two witnesses.

CLARENCE E. CARPENTER.

Witnesses:
W. E. TAYLOR,
W. S. SMITH.